Jan. 17, 1950     A. J. MUSSELMAN     2,494,958
METHOD AND APPARATUS FOR TREADING TIRES
Filed Aug. 12, 1947

INVENTOR.
ALVIN J. MUSSELMAN
BY
Kwis, Hudson, Boughton & Williams
ATTORNEYS

Patented Jan. 17, 1950

2,494,958

UNITED STATES PATENT OFFICE 2,494,958

METHOD AND APPARATUS FOR TREADING TIRES

Alvin J. Musselman, Santa Barbara, Calif.

Application August 12, 1947, Serial No. 768,154

5 Claims. (Cl. 117—2)

This invention relates to a method and apparatus for treading tires. More particularly, it has to do with a method and apparatus for applying liquid latex to the casing of a tire in consecutive layers of gradually decreasing width in order to form a tire which shall be heaviest in the zone of greatest wear. The performance of the operations of applying said layers and drying them one by one may be carried out by apparatus of simple character which can be operated by relatively unskilled labor to produce tires of high quality at low cost.

One of the objects of the invention is the provision of a method and apparatus for building tires without the use of vulcanizing apparatus and all the expense attendant upon such conventional procedures.

Another object is the provision of a method and apparatus for treading tires which shall be adaptable for use by small concerns with limited capital.

Other objects and features of novelty will appear as I proceed with the description of that embodiment of the invention which, for the purposes of the present application, I have illustrated in the accompanying drawing, in which.

Figure 2:
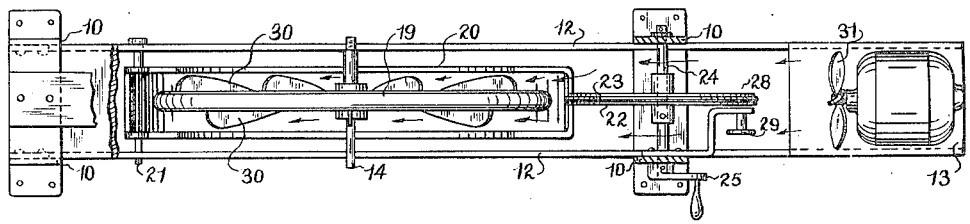
Fig. 2 is a plan view with the drying lamps omitted, the view being taken substantially on the line 2—2 of Fig. 1.
Figure 1:
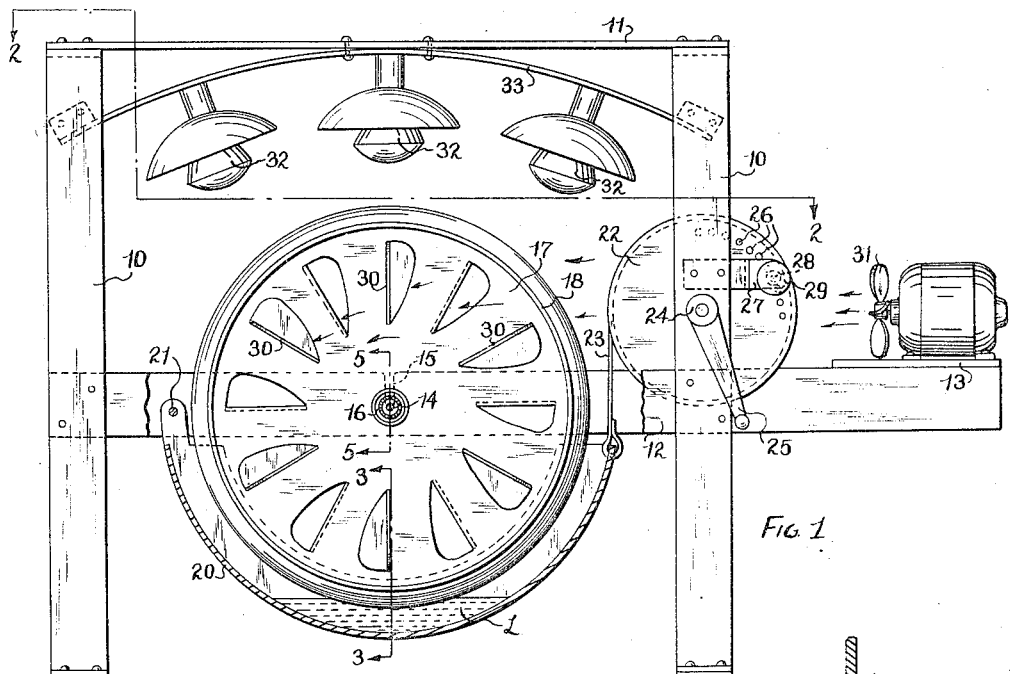
Fig. 1 is an elevational view, somewhat diagrammatic in character, of an apparatus which may be employed in carrying out the method of this invention.

Referring to the drawing, 10 are frame uprights, joined at the top by an elongated plate 11, while the uprights 10 at the sides of the frame are joined by horizontal members 12 having outboard portions that are connected by a transverse plate 13. The horizontal members 12 removably support a spindle 14. As shown, these frame members have opposed slots 15 extending downwardly from their upper edges, into which the ends of the spindle may be lowered. Spindle 14 is mounted snugly in the inner race of an antifriction bearing 16 which is disposed at the hub of a wheel or circular carrier 17 having a rim 18 formed to receive and hold a tire casing 19. While the particular type of casing and the fabric from which it is made constitute no part of the present invention, reference may be had to my copending application Serial No. 717,057, filed December 18, 1946, for a disclosure of a fabric suitable for the purpose.

A trough 20, the bottom of which is approximately semi-circular in the lengthwise direction, depends from the frame. While it may be otherwise supported, this trough is preferably hung at one end upon a hinge pin or pivot 21 which extends through transversely aligned holes in the frame members 12. This pin is preferably removable in order that the trough may be removed for cleaning or replacement. The opposite end of the trough is provided with an apparatus for raising or lowering that end. In the illustrated case, this apparatus comprises a sheave or pulley 22 over which a cable or other flexible connection 23 runs, one end of the cable being attached to the spool 22 and the other to trough 20. This spool 22 is pinned to a shaft 24 which is mounted in bearings in the frame uprights 10 and has a crank handle 25 at one end by means of which the spool may be turned. Near its rim, spool 22 may be provided with a series of perforations 26, any one of which may be caused to register with a perforation in a bracket 27 that is attached to one of the frame members 10. A pin 28 with a knob 29 on one end may be caused to project through the perforation in the bracket into a selected one of the perforations 26. Pin 28, when projected into one of the perforations 26, therefore constitutes a stop to limit rotation of the spool 22 in the clockwise direction and the consequent upward movement of trough 20. Pin 28 of course holds the trough at the selected elevation until it is withdrawn, when the operator may permit the trough to swing down by gravity, its motion being controlled by the hand of the operator on the crank 25.

Suitable means are provided for rotating the wheel 17 and the casing 19 carried thereby. This means may take various forms, but I have found that a series of vanes 30, alternating ones of which are bent out from the wheel 17 in opposite directions, against which a stream of air from a fan 31 plays, supplies sufficient power for the operation of a wheel of the size required for bicycle tires. This stream of air playing over the rotating wheel assists in drying the latex applied to the casing, but further drying means such as a series of infra red lamps 32 may be employed if desired, these lamps being mounted in the frame as by means of a curved supporting strip 33. It will be obvious that the fan may be positioned to play its stream of air against the side of the wheel if the vanes 30 are designed accordingly.

*Operation.*—As the first step in the method of treading a tire by this invention, the casing 19 of the tire is mounted on the rim 18 of wheel 17. Then, while the trough 20 is in lowered position, the wheel is put in place in the frame, the ends of spindle 14 being guided into the slots 15 in the frame members 12. One spindle end may be squared as illustrated to prevent spindle rotation. A predetermined amount of liquid latex is then poured into the trough 20 to make a pool L of the desired depth. The fan 31 is then started and the operator turns crank 25 clockwise to wind up cable 23 and so raise the trough that the casing is immersed to a depth such that the latex almost touches the rim 18, the pin 28 being inserted in the proper perforation 26 to support the trough at that elevation. Wheel 17 turns counterclockwise due to the stream of air from fan 31 playing upon the vanes 30. It turns at a low rate of speed, of the order of 16 revolutions per minute. To attain the desired speed with the power means illustrated, the fan 31 may be moved upon the transverse frame plate 13 toward or away from the wheel, or a fan of variable speed may be employed.

The wheel is permitted to turn one revolution in order to apply a coating of latex all around the casing. The operator then withdraws pin 28 and permits the trough to descend far enough to separate the casing from the pool L of latex. Wheel 17 then continues to turn, and the effect of the fan blown air combined with heat from lamps 32 rapidly dries the coating of latex applied by the first immersion. The latex when first applied has a milky white color. As it dries, the color changes to a light tan shade, and the operator is thereby apprised of the fact that the next layer may then be applied.

Figures 3, 4, 5:
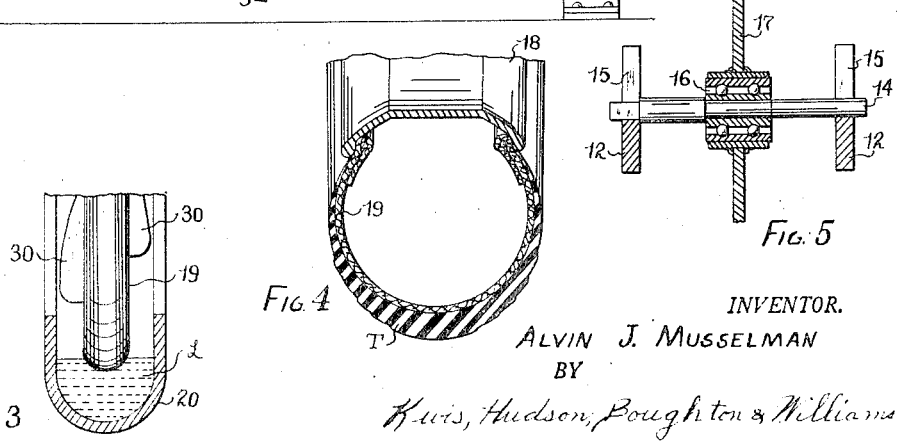
Fig. 3 is a detail sectional view taken substantially on the line 3—3 of Fig. 1, but on a larger scale.
Fig. 4 is a cross-sectional view of a completed tire on a still larger scale.
Fig. 5 is a vertical sectional view taken substantially on the line 5—5 of Fig. 1.

The operator now again winds up cable 23 to raise trough 20 to a slightly lower elevation than for the first application of the latex, and inserts the pin 28 in the next hole 26 to the left of that in which it was inserted for the first application. After a rotation of wheel 17 through a complete revolution to apply a second layer of latex to the casing, the trough is again lowered to separate the casing from the pool of latex, and the second layer is dried in the same manner as before. Alternate immersion and drying steps are continued, each immersion being to a lesser depth than the preceding one, so that a stepped tread T, shown in Fig. 4, is built up in the casing, each successive step being narrower than the one preceding it.

In the application of latex to a casing by the method described, centrifugal force and gravity play an important part, that is to say, these forces tend to graduate each layer of latex from a thin coating on the side wall of the tire to a relatively thick one on the tread. A high speed of rotation is undesirable because it results in throwing the latex off the periphery of the casing. Too low a speed is also undesirable because then the application of latex tends to be of the same thickness throughout its extent. The speed of rotation is therefore critical and bears a certain relation to the diameter of the tire. For a tire of 26 inches to 29 inches diameter, a speed of rotation of approximately 16 revolutions per minute gives the best result. This is equivalent to a linear speed of about two feet per second.

Having thus described my invention, I claim:

1. The method of applying a tread to a tire casing, which comprises mounting the casing on a wheel, causing the wheel to rotate in a vertical plane through at least one complete revolution while the casing projects into a pool of liquid latex, separating the casing from the pool of latex and permitting the applied layer to dry, causing the wheel to rotate through additional complete revolutions one at a time while the casing projects into said pool, the rate of rotation being such as to cause said casing to travel through the latex at a speed of about two feet per second, and drying the casing between successive immersions, each immersion being to a depth less than the preceding one, whereby the thickness of the tread increases toward the central plane of the casing.

2. The method of applying a tread of stepped thickness and width to a tire casing, which comprises mounting the casing on a wheel, mounting the wheel to rotate around a horizontal axis above a trough containing liquid latex, causing relative motion of the wheel and trough toward each other until the casing projects into said latex to a predetermined extent, rotating the wheel through at least one revolution while the casing is thus partially immersed, moving the wheel and trough in the opposite direction relatively to separate the casing from the pool of liquid latex, drying the layer of latex applied by the said immersion while the wheel and trough are separated, again moving the wheel and trough relatively toward each other but to a lesser extent than before, rotating the wheel through at least one revolution to apply a second layer of latex, separating the wheel and trough to permit drying of the second layer, and continuing with further immersions each to a depth less than that of the preceding one, and drying after each immersion, until a tread of the desired stepped thickness and width is formed.

3. The method of applying a tread to a tire casing as defined in claim 2, wherein a stream of air is employed for turning the wheel and for drying each applied layer of latex.

4. The method of applying a tread to a tire casing as defined in claim 2, wherein the casing travels through the latex at a linear speed of approximately two feet per second.

5. In apparatus for treading tires, a frame, a wheel supported upon said frame for rotation about a horizontal axis, the periphery of said wheel being adapted to receive and hold a tire casing, a trough hung from said frame beneath the wheel for the reception of liquid latex, means for moving said trough up and down and securing it in selected vertical positions, said wheel being provided with vanes, and a power driven fan arranged to force air against said vanes for rotating the wheel and for drying the latex coating adhering to the tire casing as it leaves the pool of liquid latex.

ALVIN J. MUSSELMAN.

REFERENCES CITED

The following references are of record in the file of this patent:

UNITED STATES PATENTS

| Number | Name | Date |
|---|---|---|
| 695,986 | Wilson | Mar. 25, 1902 |
| 1,537,117 | Hurd | May 12, 1925 |
| 1,760,879 | Maynard | June 3, 1930 |
| 1,862,837 | Wieland et al. | June 14, 1932 |
| 1,920,720 | Thurman et al. | Aug. 1, 1933 |
| 2,425,332 | Langdon | Aug. 12, 1947 |